(12) United States Patent
Giordan et al.

(10) Patent No.: US 10,907,507 B2
(45) Date of Patent: Feb. 2, 2021

(54) DEVICE FOR MEASURING AT LEAST ONE PARAMETER OF AN AERODYNAMIC FLOW OF A TURBINE ENGINE EQUIPPED WITH A VIBRATORY DAMPING MEANS AND TURBINE ENGINE DUCT EQUIPPED WITH SUCH A DEVICE

(71) Applicant: SAFRAN AIRCRAFT ENGINES, Paris (FR)

(72) Inventors: Jeremy Giordan, Arcueil (FR); Thibault Xavier Alexis Berranger, Maincy (FR); Guillaume Jose Rodrigues, St. Fargeau-Ponthierry (FR); Stephane Rousselin, Hericy (FR); Mathieu Raymond Paul Sezeur, Antony (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 227 days.

(21) Appl. No.: 16/154,605

(22) Filed: Oct. 8, 2018

(65) Prior Publication Data

US 2019/0107008 A1    Apr. 11, 2019

(30) Foreign Application Priority Data

Oct. 9, 2017  (FR) ...................................... 17 59421

(51) Int. Cl.
| | | |
|---|---|---|
| *F01D 25/28* | (2006.01) | |
| *G01M 15/14* | (2006.01) | |
| *G01P 5/00* | (2006.01) | |
| *G01M 9/06* | (2006.01) | |
| *G01F 1/34* | (2006.01) | |
| *G01F 15/18* | (2006.01) | |

(52) U.S. Cl.
CPC ............. *F01D 25/285* (2013.01); *G01F 1/34* (2013.01); *G01M 9/065* (2013.01); *G01M 15/14* (2013.01); *G01P 5/00* (2013.01); *F05D 2220/323* (2013.01); *F05D 2230/60* (2013.01); *F05D 2260/83* (2013.01); *F05D 2300/43* (2013.01); *G01F 15/18* (2013.01)

(58) Field of Classification Search
CPC ........ F01D 25/285; F01D 17/02; F01D 17/20; F01D 17/085; F01D 21/003; F01D 9/02
See application file for complete search history.

(56) References Cited

U.S. PATENT DOCUMENTS 2,946,221 A  *  7/1960  Annear ................. F01D 21/003
                                                                        73/861.65
4,433,584 A  *  2/1984  Kokoszka ............... G01P 5/175
                                                                        73/861.66

(Continued)

*Primary Examiner* — Aaron R Eastman
(74) *Attorney, Agent, or Firm* — Womble Bond Dickinson (US) LLP

(57) ABSTRACT

A measuring device for measuring at least one parameter of an aerodynamic flow of a turbine engine. The device operates to collect parameters of the flow. A body extends along a radial axis (L). A connecting part is fastened to a first end of the body and designed to secure the measuring device to a radially outer wall of the turbine engine. A stud is inserted and mounted on a second end of the body radially opposite the first end. The stud includes at least a portion of a rubberlike material designed to come into contract with a radially inner wall of the turbine engine.

13 Claims, 3 Drawing Sheets

(56) References Cited

U.S. PATENT DOCUMENTS

| | | | | |
|---|---|---|---|---|
| 4,605,315 A | * | 8/1986 | Kokoszka | G01K 13/02 |
| | | | | 374/138 |
| 7,527,471 B2 | * | 5/2009 | Schilling | F01D 17/162 |
| | | | | 29/889.2 |
| 2014/0182292 A1 | * | 7/2014 | Hudon | F01D 17/02 |
| | | | | 60/722 |
| 2016/0348531 A1 | * | 12/2016 | Rice | F02C 7/00 |
| 2017/0138216 A1 | * | 5/2017 | Giordan | G01P 5/14 |

* cited by examiner

US 10,907,507 B2

DEVICE FOR MEASURING AT LEAST ONE PARAMETER OF AN AERODYNAMIC FLOW OF A TURBINE ENGINE EQUIPPED WITH A VIBRATORY DAMPING MEANS AND TURBINE ENGINE DUCT EQUIPPED WITH SUCH A DEVICE

1. FIELD OF THE INVENTION

This invention relates to the field of measuring devices for measuring at least one parameter of an aerodynamic flow, particularly an aerodynamic flow of a turbine engine. It equally relates to a turbine engine duct that is equipped with such a measuring device.

2. STATE OF THE ART

In the process of building turbine engines, especially turbine engines for aircraft, they undergo a battery of tests and trials in order to verify and validate that they operate properly on the one hand, and that they can maintain their integrity and performance on the other hand. Following the validation of these tests and trials, a certificate is obtained for them to be brought into operation. More especially, during the tests and trials, certain aerodynamic flow parameters are measured by means of a measuring device, including pressure, temperature and/or acceleration.

The measuring device is generally known as an intrusive measuring instrument or measuring comb. The measuring device is mounted radially in one or several specific areas of the turbine engine carrying the aerodynamic flow to be measured, such as a duct. Actually, the air flowing through the duct displays different characteristics in different areas of the duct, such as in the central part of the duct, along the walls delineating the duct, upstream of the stator blades, etc. Therefore, several devices may be needed to come up with a comprehensive mapping of the flow parameters in the duct. Due to their intrusive character in the aerodynamic flow, the measuring devices may disrupt the aerodynamic flow, thereby generating inaccurate readings. This is all the more so due to their imposing dimension when they are mounted in trial turbine engines, especially turbine engines of smaller sizes than standard turbine engines. The devices may also be made to undergo vibratory phenomena generated on the one hand, by a disruption of the flow due to the inclusion of the measuring device in the flow, thereby creating propeller wakes on the turbine engine blades, and on the other hand, by the imbalances arising during the rotation of the turbine engine from the action of the moving parts of the turbine engine that are not dynamically balanced. Generally speaking, turbine engine parts can never be perfectly dynamically balanced. The imbalances and disturbances are likely to correspond to one of the self-resonant frequencies of the measuring device. In some cases, the measuring device may equally undergo a flutter phenomenon, i.e. it may begin to "flap" like a flag in the wind and/or affect aerodynamic performance. In the worst case scenario, the measuring device may go into resonance or break altogether, thereby leading to the complete damage of the turbine engine. This may therefore have significant consequences on finances and test schedules.

Document FR 3 036 735 describes a measuring device that seeks to overcome vibratory phenomena. This measuring device comprises a means to record data on flow parameters, as well as a body extending along a radial axis and carrying the data collecting means. The device also comprise a first connecting part that is fastened to a first end of the body and designed to secure the measuring device on a radial outer wall of the turbine engine, and a second connecting part fastened to a second opposite end of the body and to a radial inner wall of the turbine engine duct.

However, given that this measuring device is fastened to the wall of the duct, it acts on natural frequencies, but not on the potential intensity of the vibratory response. The measuring device is "stiffer". More especially, natural frequencies display higher values, but there are persistent operability restrictions, including a prohibition of stabilisation at the corresponding engine operating speeds. Another disadvantage of this measuring device is that the radial inner wall of the duct needs to be modified locally to fit the measuring device into the duct. In some turbine engines, such modification, especially a modification of the radial inner wall of the duct, is not always possible depending on the level of complexity of the turbine engine's environment and the limited space. Actually, there is need to provide for a fastening means like a screw or nut to attach the measuring device to the radial inner wall of the duct. Moreover, this fastening means extends the installation and maintenance timeline, thereby equally impacting the timelines for tests and the cost of the turbine engine.

It is also known from Document EP3168586 a measuring device that seeks to overcome vibratory phenomena. However, this measuring device comprises flexible elastomeric connections fitted in between two radial sections of a portion of the body, which makes the manufacturing and mounting of the device even more complex.

3. AIM OF THE INVENTION

The applicant has therefore set itself the target of delivering a measuring device that is more resistant to vibratory constraints, while minimising aerodynamic flow disturbances, and allowing for quick mounting and dismantling of the measuring device, such that test and trial timelines are not delayed.

4. SUMMARY OF THE INVENTION

The actual aim in line with the invention is achieved through a measuring device for measuring at least one parameter of an aerodynamic flow of a turbine engine, the said device comprising:
  data collecting means to collect data on flow parameters;
  a body extending along a radial axis and carrying the data collecting means; and
  a connecting part fastened to a first end of the body and designed to secure the measuring device to a radial outer wall of the turbine engine.
  the measuring device comprising a stud inserted and mounted on a second end of the body located radially opposite the first end, the said stud comprising at least a portion in rubberlike material designed to come into contact with a radial inner wall of the turbine engine.

In this manner, the solution helps to achieve the aforementioned aim. In particular, the stud helps to act on the natural frequencies of the measuring device and on the potential intensity of the vibratory response. More than 90% of the vibratory response is dampened when the measuring device is operated in its preferred mode, namely at a stabilised speed. Additionally, this configuration does not entail any modification of the duct walls or the structural features of the measuring device. The duct is made of materials that allow it to be compressed during the installation of the measuring device, thereby allowing the latter to mould itself to the shape of the radial inner wall of the duct. It is also quick and easy to mount.

According to a feature of the invention, the stud is designed to come into contact through a flexible connection with the radial inner wall, such that it can be crushed when it comes into contact with the radial inner wall of the turbine engine.

According to a feature of the invention, the stud comprises a reinforcement part moulded inside the said stud and made of a material that is more solid than that of the stud, with a distance e having been set between the reinforcement part and an outer surface of the stud designed to come into contact with the radial inner wall. This arrangement helps to reinforce the structure of the stud, thereby sustaining the body of the measuring device.

According to a feature of the invention, the stud is configured such that it is crushed at a predetermined value ranging between 1 and 4 mm, which is less than the distance e.

According to another feature of the invention, the stud is made of a polymeric material.

Preferably but without limitation, the rubberlike material is actually polydimethylsiloxane.

According to a feature of the invention, the stud is mounted removably on the second end of the body, by gluing for instance. This allows for the installation of all kinds of measuring devices merely by changing the stud. This feature equally eases maintenance of measuring devices in case the studs deteriorate.

According to a feature of the invention, the body comprises at least an inner longitudinal cavity that extends along a radial axis, the said longitudinal cavity accommodating at least part of the data transmission means connected to the data collecting means.

According to a feature of the invention, the connecting part comprises an attachment flange designed to be fastened to the radial outer wall and to carry the said body through the flow of an aerodynamic duct of the turbine engine.

The invention also relates to an annular duct for the aerodynamic flow of a turbine engine comprising a radial outer wall and a radial inner wall, the said duct being equipped with at least one measuring device with any of the previously mentioned features radially installed in the aerodynamic flow, the stud arranged in between the second end of the body and the radial inner wall, and coming into contact through a flexible connection with the radial inner wall.

According to a feature of the invention, there is a provision for a predetermined gap between the flange and a boss of the radial outer wall designed such that provision is made for a predetermined deformation of the radial inner wall of the duct.

Preferably, but without limitation, the predetermined deformation of the radial inner wall of the duct ranges between 0.5 and 3 mm. This configuration helps to prevent any impact on the performance of the turbine engine.

Preferably, a seal is fitted in between the flange of the connecting part and a boss of the radial outer wall.

Preferably, the seal is a flat seal.

The invention also relates to a turbine engine comprising a duct that has any of the aforementioned features.

The invention also relates to a method for mounting a measuring device with any of the aforementioned features in a turbine engine duct, the said method comprising the following steps:

Setting of the stud on the second end of the body of the measuring device;

Insertion of the measuring device together with the stud into the duct such that the stud comes into contact with a radial inner wall of the duct;

Provision of a predetermined gap between the boss of the radial outer wall of the duct and the flange;

Insertion of a seal into the predetermined gap;

Tightening of the flange and the boss using fastening means such that there is a predetermined crushing of the stud on the radial inner wall of the duct.

The method equally involves a machining step to remove any extra thickness on the stud where the value of the gap measured in between the boss and the flange is more than a value of the predetermined gap.

Such a method eases the installation of the measuring device with a damping stud. In particular, this helps to ensure the physical and mechanical integrity of the measuring device and the turbine engine duct. By controlling the predetermined gap G, it is possible to obtain an appropriate stress level in between the stud and turbine engine duct. Likewise, the predetermined crushing of the stud helps to achieve a predetermined compression of the wall. This ensures proper maintenance of the measuring device, while preventing any damage on the duct caused by excessive stress and providing leak-tightness at the level of the seal.

5. BRIEF DESCRIPTION OF FIGURES

The invention will be better understood and other aims, details, specifications and advantages of same will come out more clearly after reading the following detailed explanatory description of an embodiment of the invention provided solely by way of illustration without limitation and with reference to the appended drawings on which:

6. DESCRIPTION OF EMBODIMENTS OF THE INVENTION

Figure 1:
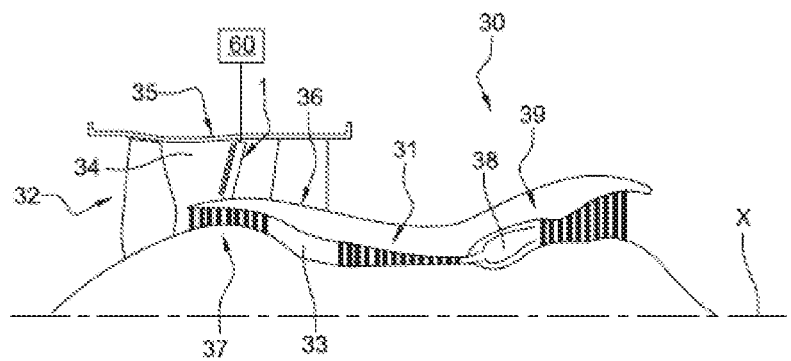
FIG. 1 is an axial and partial view diagram of an example of a bypass turbine engine in which the invention is implemented.

FIG. 1 presents a cross-section and a partial view of a turbine engine with a longitudinal axis X, particularly a bypass turbine engine according to the invention. It goes without saying that the invention is not restricted to this kind of turbine engine.

Generally, the bypass turbine engine 30 comprises one gas compressor 31, 37 with a fan 32 installed upstream of the latter. Generally, in this invention, the terms "upstream" and "downstream" are defined based on the flow of gas in the turbine engine and following the longitudinal axis X. The turbine engine 30 comprises a primary annular duct 33 that conveys a primary flow or hot flow that streams through the one gas compressor 31, 37 and a secondary annular duct 34 that conveys a secondary flow or cold flow around the gas compressor 31, 37. The primary and secondary ducts are coaxial ducts. In particular, the secondary duct 34 is radially delineated by a fan casing 35 and an inner casing 36 that houses the gas compressor 31, 37. The term "radial" is defined based on a radial axis Z that is substantially perpendicular to the longitudinal axis X. The aerodynamic flow streaming through the primary duct 33 moves from upstream to downstream, through a compressor assembly 37, a combustion chamber 38 and a turbine assembly 39. Each duct 33, 34 is delineated by a radial inner wall 40 (cf. FIG. 3) and radial outer wall 41 (cf. FIG. 3) relative to the longitudinal axis X. The radial inner and outer walls 40, 41 are annular and coaxial walls.

Figure 2:
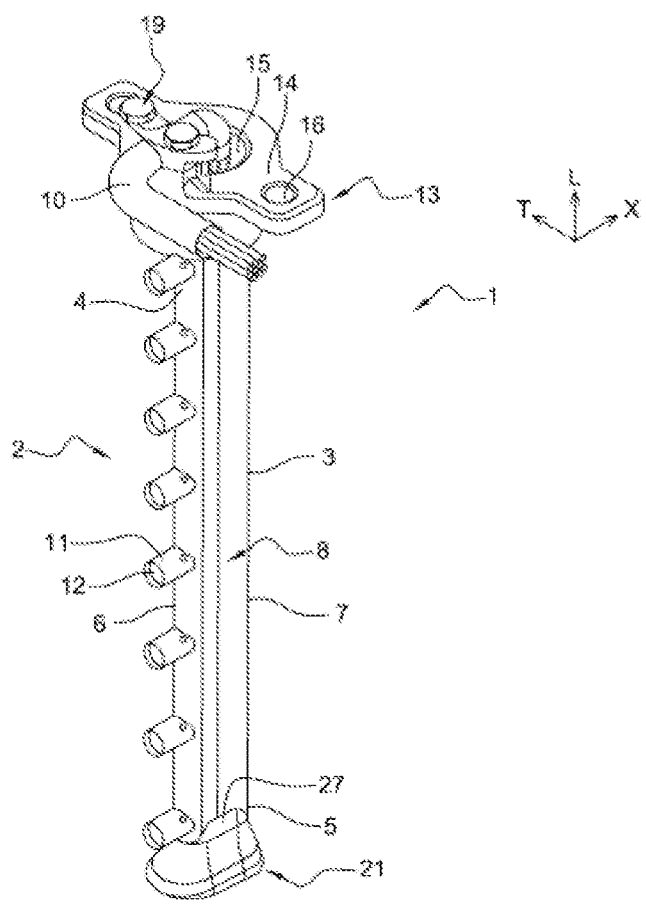
FIG. 2 is a perspective view of an example of an embodiment of the measuring device according to the invention.

At least one measuring device 1 of at least one parameter of an aerodynamic flow, as illustrated in FIG. 2, is mounted at least partly in the flow streaming through the turbine engine such that a mapping of the pressures, temperatures and/or accelerations of the said flows can be carried out. The measurement is considered intrusive since it is carried out directly in the flow. The measuring device 1 can be installed in a substantially radial manner in the primary duct 33 or in the secondary duct 34 relative to the longitudinal axis X. The measuring device 1 comprises data collecting means 2 to collect the parameters of the flow and a body 3 that houses the data collecting means 2. The body 3 is profiled and extends in a longitudinal direction L in between the radial inner and outer walls 40, 41 of the duct 33, 34. In particular, the body 3 extends in between a first end 4 and a second end 5. The longitudinal direction L is substantially parallel to the radial axis of the turbine engine when the device is installed in one of the ducts 33, 34. The body 3 comprises a leading edge 6 and a trailing edge 7 that are axially opposite to each other. The leading edge 6 and the trailing end 7 link up, upstream and downstream respectively, two opposite sides 8, one of which is illustrated in FIG. 2 in a transverse direction T that is perpendicular to the longitudinal and radial axes. More specifically, the body 3 has a thickness that decreases substantially from the leading edge 6 to the trailing edge 7. The opposite sides 8 thus meet each other to form an edge at the level of the trailing edge 7. The body's profiled shape helps to cut down on the aerodynamic losses generated in the flows where the measuring device 1 is mounted in one of the ducts 33, 34 of the turbine engine. When the measuring device 1 has been installed, the leading edge 6 is upstream of the trailing edge 7 relative to the direction of the aerodynamic flow.

The data collecting means 2 extends axially from the leading edge 6 of the body 3. They are also arranged and fitted evenly along the leading edge 6, namely in the longitudinal direction L. The data collecting means 2 may measure data on pressure, temperature and/or acceleration of flows.

Figure 3:
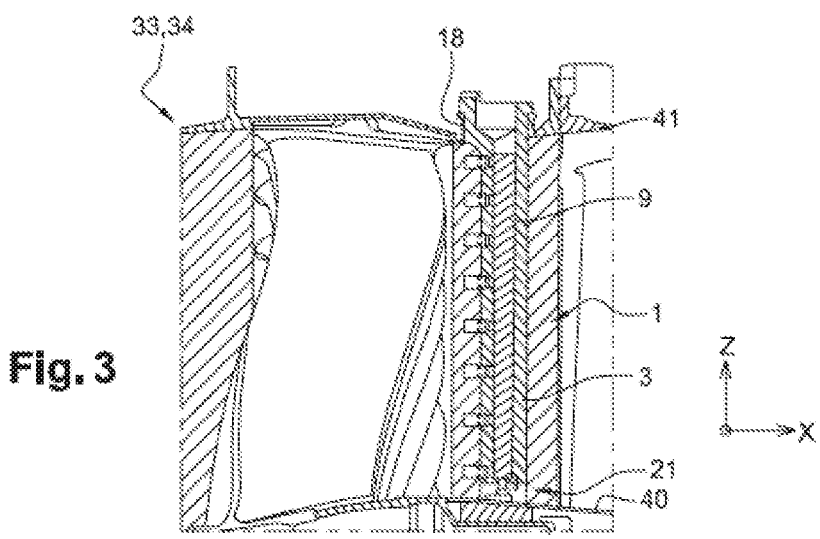
FIG. 3 is an axial view of a measuring device according to the invention mounted in an area of a duct of the turbine engine.

With reference to FIG. 3, the body 3 also comprises a longitudinal cavity 9 that extends substantially in the longitudinal direction L and inside the body 3. The cavity 9 leads to one of the sides 8 of the body 3. The cavity 9 interacts with each of the data collecting means 2. Each of the data collecting means 2 comprises outlets leading to the cavity 9. The measuring device comprises transmission means 10, shown in FIG. 4, that are connected on the one hand to the data collecting means 2 and on the other hand to a data processing system 60 on the turbine engine, as illustrated schematically in FIG. 1. The transmission means 10 runs partly through the longitudinal cavity 9 and extended towards the exterior of the measuring device 1. In this example, the transmission means 10 comprises pressure ducts and/or temperature ducts.

The data collecting means 2 may be equipped with temperature and pressure sensors. More specifically, the data collecting means may comprise a thermocouple module to measure the temperature or nozzles to measure the pressure of the flow. These are connected to the ducts that are equally connected to the data processing system 60 arranged in the turbine engine 30. In this example, each of the data collecting means 2 comprises a nozzle 11. Each nozzle 11 has a substantially cylindrical and straight body. The body of the nozzles 11 also comprises an inlet 12 that is open to the flow in order to collect a sample upstream of the leading edge 6. The thermocouples may be installed in the nozzles 11. These are connected to the ducts that are equally connected to the data processing system 60.

The cavity 9 is filled up with filling materials (not illustrated) in order to reduce aerodynamic losses. The filling materials comprise a first filling element made of polymeric material and/or ceramics that is arranged in the cavity 9 to fill it up and hold the transmission means in place. This first filling element helps to rebuild the full profile of the side wall of the measuring device. An example of one of the polymeric materials to be used is elastomer. Alternatively, the filling elements also include a second filling element made up in this case of foil and sheet metal that are inserted and secured to the body 3 to rebuild the full profile of the side wall 8 of the measuring device. In this case, the second filling element covers the first filling element.

Figure 4:
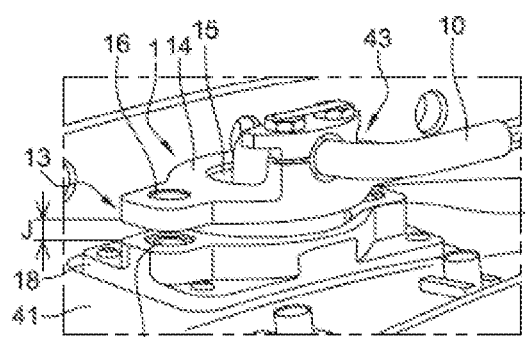
FIG. 4 is a perspective view and a detailed view of the upper part of the measuring device according to the invention mounted in a turbine engine.

With reference to FIGS. 3 and 4, the measuring device comprises a connecting part 13 that is fastened to the first end 4 of the body 3. The connecting part 13 is designed to secure the measuring device to the radial outer wall 41 of the duct 33, 34. The connecting part 13 comprises a flange 14 that helps to secure the measuring device to the turbine engine and sustain the body 3, which extends across the aerodynamic flow. More specifically, the flange 14 comprises a wall extending on a plane that is substantially perpendicular to the longitudinal direction L of the body 3. It has an opening 15 that goes through both sides of the wall in the longitudinal direction, thereby allowing for the passage of the transmission means 10 outside the measuring device 1. The opening 15 leads to the longitudinal cavity 9. The flange 14 also comprises through-holes 16 on either side of its wall facing the longitudinal direction L. These through-holes 16 are lined up with slots 17 fitted in a boss 18 formed on the radial outer wall 41 of the duct 33, 34. The boss 18 extends from an outer surface of the radial outer wall 41. In other words, the boss 18 is located outside the duct 33, 34. The boss 18 is designed to accommodate the flange 14 of the measuring device. The through-holes 16 and the slots 17 are fitted with fastening means 19 (cf. FIG. 2) that are used to secure the flange 14 to the radial outer wall 41. For instance, the fastening means 19 comprise screws, bolts or other threaded parts in order to ease the mounting and dismantling of the measuring device. In this case, the flange 14 has a substantially circular body with two ears on either side of the body, the said two ears each comprising one of the through-holes 16. The boss 18 also comprises a hole 20 to accommodate the body 3 of the measuring device 1 that extends radially in the flow. The flange 14 is arranged outside the duct 33, 34. As illustrated in detail in FIGS. 3 and 13, the measuring device comprises a fitting hood 43 that helps to secure the transmission means 10 to the flange 14 and direct them towards the data processing system 60.

Figure 5:
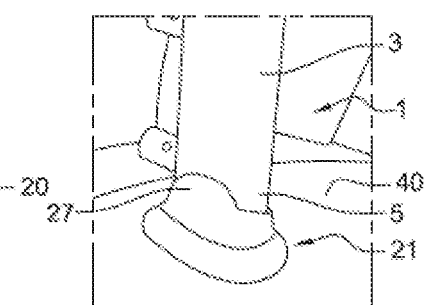
FIG. 5 is a perspective and a detailed view of the lower part of the measuring device according to the invention mounted in a turbine engine.

With reference to FIGS. 3 and 5, the measuring device also comprises a stud 21 that is mounted on the second end 5 of the body 3. The stud 21 is mounted removably. The stud 21 is an insert on the measuring device. In this description, the term "insert" refers to a part that is separate from the measuring device and that is not produced following the same method as the measuring device. The stud 21 is designed to come into contact with the radial inner wall 40 of the duct through a flexible connection. The stud 21 is made of elastic material to produce a damping stud that is designed to raise the natural frequencies of the intrusive measuring instrument on the one hand, and to dissipate the energy from the vibratory constraints on the other hand. The stud 21 is arranged in between the radial inner wall 40 of the turbine engine and the second end 5 of the body 3 of the measuring device.

Figure 6:
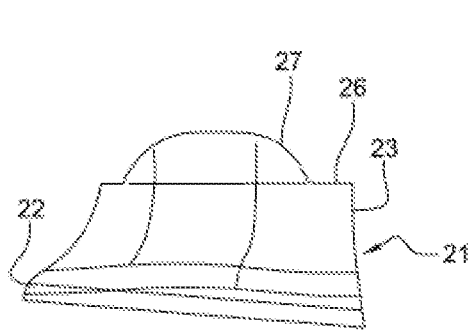
FIG. 6 is a front view of the stud that acts as a damping stud according to the invention.
Figure 7:
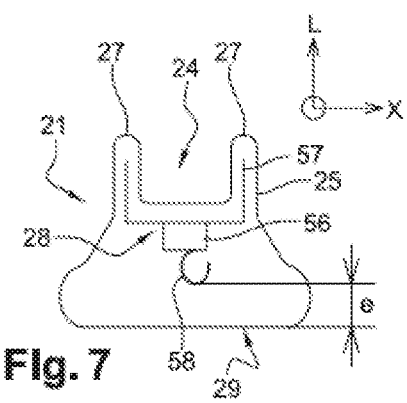
FIG. 7 is an axial view diagram illustrating an example of the stud equipped with a metal interface embedded in its material.

As described in more detail in FIGS. 6 and 7, the stud 21 comprises a base 22 from which a body 23 extends. The latter comprises a bowl 24 (cf. FIG. 7) on its upper part that is designed to fit on the second end 5 of the body 3 of the measuring device. The bowl 24 is bordered by a peripheral skirt 25. The peripheral skirt 25 comprises a peripheral edge 26 with two wings 27 extending therefrom, which wings are arranged opposite each other. The bowl 24 and the wings 27 comprise a metal interface 28 embedded in the material of the stud 21 to allow for a proper positioning and maintenance of the stud on the second end 5 of the measuring device 1 body. The metal interface 28 is embedded in the material during the manufacturing process of the stud 21 described below. The second end 5 and the stud 21 are held together, preferably but without limitation, by gluing.

The stud 21 is designed to be crushed when it comes into contact with the radial inner wall 40 of the turbine engine as illustrated in FIG. 5. In particular, the stud 21 is crushed according to its height (in the longitudinal direction L). The stud is crushed at a value that is less than the distance obtained in between a reinforcement part, such as a hook 58 described later on in the description (cf. FIG. 7), and an outer surface 29 of the base 22 of the stud 21 that is designed to come into contact with the radial inner wall 40 of the turbine engine. The outer surface 29 is located opposite the bowl 24 in the longitudinal direction L. In this example, this outer surface is delineated on a plane perpendicular to the longitudinal direction L. During the installation of the measuring device in the duct, the stud 21 undergoes an elastic compression or crushing, so that it is moulded into the shape of the radial inner wall 40 of the duct on which it is mounted. This installation method is applied to minimise any vibratory phenomena that may affect the measuring device. Preferably, but without limitation, the crush value of the stud ranges between 1 and 4 mm. This helps to properly secure the measuring device in the duct and on the radial inner wall 40. Apart from the aforementioned crush value of 4 mm, the radial inner wall undergoes excessive deformation. Such deformation creates mechanical and aerodynamic damage of the duct. Preferably, the deformation of the radial inner wall is considered acceptable where it ranges between 0.5 and 3 mm.

The elastic material of the stud 21, especially rubberlike material, is made of polymer. Preferably but without limitation, the polymer contains a polydimethylsiloxane (PDMS). An example of a polydimethylsiloxane used to produce the stud 21 is Rhodorsil® RTV 3255. This PDMS has a (55 shore A) hardness that is comparable to that of silicon, which is quite flexible. In this manner, the stud can easily come into contact with the radial inner wall 40 without deforming the latter.

The measuring device is mounted in the duct in the following manner. Firstly, the measuring device 1 is inserted through the hole 20 of the boss 18 provided on the radial inner wall 40. During this step, the damping stud 21 is already fastened to the measuring device 1. The stud 21 is brought into contact with the radial inner wall 40 of the duct. This operation is carried out without applying any stress on the measuring device 1, especially on the stud 21. The flange 14 of the measuring device 1 is located on the radial outer surface of the radial outer wall and is mounted with a predetermined gap J created in between the flange 14 and the boss 18. The predetermined gap is measured in order to make sure that when mounted, the stud 21 causes a deformation of the radial inner wall of the duct of between 0.5 to 3 mm. Likewise, the predetermined gap helps to substantially determine the crush value of the stud 21. In other words, the value of the predetermined gap helps to determine whether the stud 21 has an extra thickness or not.

Figure 13:
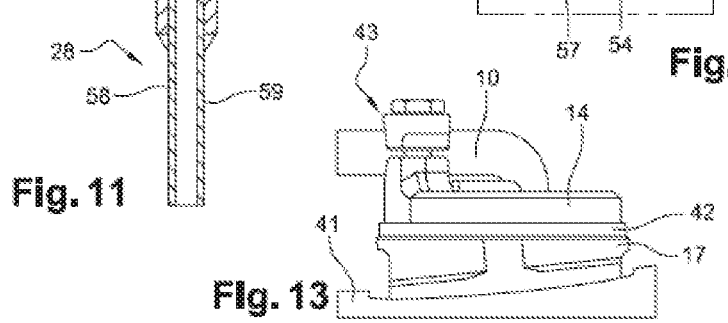
FIG. 13 is a detailed and a partial view illustrating a measuring device mounted in a turbine engine duct with a flange that interacts with a boss of the duct wall, with a seal fitted in between the flange and the boss.

The value of the gap is measured where the stud is in contact with the radial inner wall 40. In this respect, the value of the predetermined gap hovers around 2 mm+/−0.5 mm. If the value of the gap is accurately measured, i.e. substantially equal to the value of the predetermined gap J of 2+/−0.5 mm, a seal 42 is fitted in between the flange 14 and the boss 18 as illustrated in FIG. 13. Preferably, but without limitation, the seal 42 is a flat seal. If the value of the measured gap is more than the value of the predetermined gap, the extra thickness of the stud is removed. The mounted stud 21 is therefore machined to remove the extra thickness. If the value of the measured gap is less than the value of the predetermined gap, the mounted stud 21 is replaced with another stud. The operator will once more check to make sure that the new stud helps to obtain the desired predetermined gap G.

The attachment flange 14 is secured using fastening means 19, thereby making provision for delicate tightening. The delicate tightening is made possible by alternating the tightening of each fastening means to ensure that an even tightening is obtained and to allow for a progressive compression or crushing of the stud 21. Preferably, the fastening means are tightened by applying a predetermined torque to ensure that the tightening is even and progressive.

Figure 8:
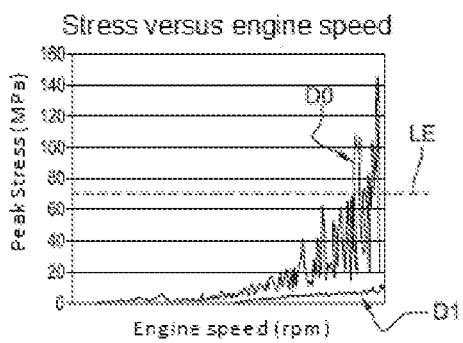
FIG. 8 is a graphic illustration of the vibratory response of a measuring device equipped with a stud according to the invention.
Figures 9, 10:
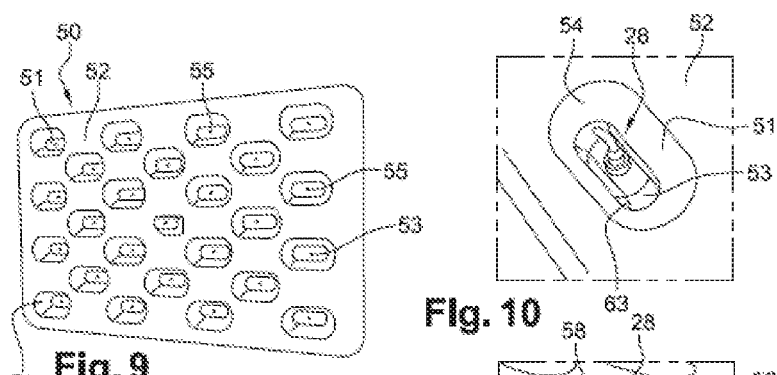
FIG. 9 is a top and a perspective view of a mould used to produce the stud.
FIG. 10 is a top view illustrating a cavity of the mould in FIG. 9, in which a metal interface is mounted.

The stud 21 is compressed on the radial inner wall 40 in order to minimise the vibratory response of the measuring device 1. As illustrated in FIG. 8, the vibratory response of the measuring device equipped with a stud that acts as a damping stud and represented by the D1 curve, is brought down far below an endurance limit LE of the measuring device. In this example, the endurance limit LE hovers around 70 MPa. The vibratory response of a measuring device in the prior art that is not equipped with such a stud is represented by a D0 curve that is far above the said endurance limit LE. A damping rate of more than 90% is obtained with the damping stud where the measuring device is operated in its preferred mode, namely at a stabilised engine speed. The flexible connection between the damping stud and the radial outer wall 40 generates an increase in natural frequencies on the measuring device. The more the stud 21 is compressed and/or the stiffer it is, the higher the frequencies generated. By compressing the stud 21, the damping effect is optimised and deformation or damage of the radial inner wall of the duct is prevented.

The stud 21 can be produced by casting, for instance. Some of the implementation steps described below are illustrated in FIGS. 10 to 13. In this respect, a mould 50 manufactured by a quick prototyping method may be used. An example of a quick prototyping method is stereolithography. In this case, the mould 50 comprises several cavities 51 extended in a first depth direction from a panel 52. Each cavity 51 has a floor 53 from which a wall 54 extends. Each cavity floor 53 comprises a routing hole 55 that runs through the wall 54 of the floor 53 on either side in the first direction. The routing hole is arranged substantially at the centre of the floor 53. Each cavity 51 of the mould is coated with a compound formulated to ease stripping of the stud after polymerisation. The coating is applied by spraying the compound, which contains a polytetrafluoroethylene (PTFE) powder.

Figures 11, 12:
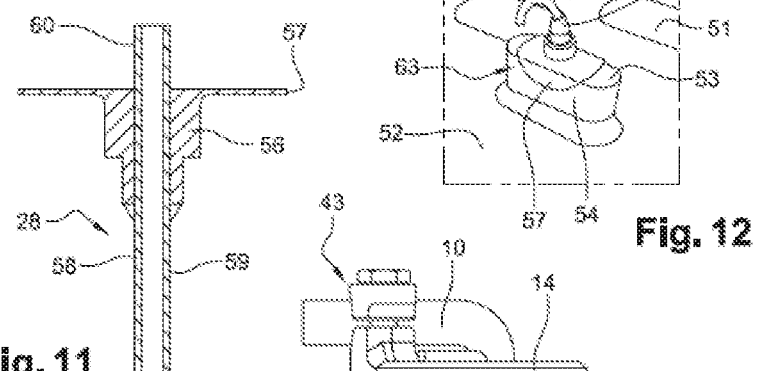
FIG. 11 is a schematic view of an example of a metal interface of the stud.
FIG. 12 is a perspective and a detailed illustration of how the metal interface is mounted on the floor of a cavity of the mould.

With reference to FIGS. 11 and 12, the floor of each cavity 51 carries a metal interface 28 designed to help position and secure the stud 21 on the second end 5 of the measuring device body. The metal interface 28 has a cylindrical body 56 with a subplate 57 located at a first end and a hook 58 located at a second end opposite the cylindrical body. The thus moulded hook 58 plays a structural role in the stud. Actually, the material of the hook 58 is harder than that of the stud encapsulating it, thereby further reinforcing the stud 21. The metal interface 28 is produced using a base cup with a cylindrical shape that forms the cylindrical body 56 and it is equipped with a collar designed to form the subplate 57. The cylindrical body 56 is drilled to allow for the passage of a tube 59 through the cylindrical body 56. The drill diameter ranges between 1 and 2 mm. The tube 59 in the cylindrical body has a length ranging between 15 and 20 mm. The cylindrical body and the tube 59 are fastened tightly to each other. The tube 59 thus fastened to the cylindrical body comprises a first portion 60 that overlaps the collar and is designed to be inserted into the routing hole 55. The length of the first portion 60 of the tube 59 ranges between 2.5 and 3.5 mm. The tube 59 comprises a second portion that overlaps the cylindrical body at the level on the second end of the said body, such that it forms the hook 58. Where the metal interface 28 is mounted on the floor of the cavity 51, the first portion 60 is inserted into the routing hole 55. Two parts of the collar are folded such that the base cup is made to fit on the floor 53 of the cavity. The folded parts are thus brought into contact with flats 63 located on either side of the floor. The flats 63 and part of the cavity wall 54 are designed to form the wings 27 of the stud 21. The folded parts of the collar are embedded in the wings of the stud 21. To ease the installation of the metal interface 28 in the cavity, especially when folding parts of the collar, the cavity may be turned inside out to form a dome. In other words, the cavity extends in an opposite direction from the first depth direction of the cavity, from the panel 52 of the mould. This is made possible due to the flexible material used to produce the mould. Thereafter, the second portion of the tube 59 is curved to form the hook 58.

A polymeric material, namely Rhodorsil® RTV 3255 in this case, is injected into the cavity of the mould comprising a metal interface 28. The cavities 51 are filled with polymeric material up to the level of the plane on which the panel of the mould 52 is delineated with no overlapping. After stripping, the stud 21 is obtained.

The stud 21 is then fastened removably to the second end 5 of the measuring device 1 body. Preferably, the stud is attached by gluing on the said second end 5.

By so doing, the vibratory performance of the measuring device is enhanced by pressing the stud 21 against the radial inner wall of the duct, which stud is deformed in an elastic manner. Furthermore, the measuring device can be mounted and dismantled quickly with no effect on the test and trial timelines, while guaranteeing good engine performance.

The invention claimed is:

1. A measuring device for measuring at least one parameter of an aerodynamic flow of a turbine engine, the said device comprising:
   data collectors to collect parameters of the aerodynamic flow;
   a body extending along a radial axis (L) and carrying the data collectors;
   a connecting part fastened to a first end of the body to secure the measuring device to a radial outer wall of the turbine engine; and
   a stud inserted and mounted on a second end of the body radially opposite the first end;
   wherein the said stud comprises at least a portion of a rubberlike material to come into contact with a radial inner wall of the turbine engine.

2. The measuring device according to claim 1, wherein the stud is to come into said contact through a flexible connection with the radial inner wall, such that the flexible connection is compressed once the flexible connection comes into contact with the radial inner wall of the turbine engine.

3. The measuring device according to claim 1, wherein the stud comprises a reinforcement part moulded in said stud and made of a harder material than the stud, a distance (e) delineated between the reinforcement part and an outer surface of the stud to come into contact with the radial inner wall.

4. The measuring device according to claim 3, wherein the stud is configured such that the flexible connection is compressed at a predetermined value ranging between 1 and 4 mm, which is less than the distance (e).

5. The measuring device according to claim 1, wherein the rubberlike material is polydimethylsiloxane.

6. The measuring device according to claim 1, wherein the stud is mounted removably on the second end of the body.

7. The measuring device according to claim 6, wherein the stud is mounted removably on the second end of the casing by gluing.

8. The measuring device according to claim 1, wherein the body comprises at least an inner longitudinal cavity that extends on a radial axis (L), said longitudinal cavity accommodating at least part of a data transmitter connected to the data collectors.

9. The measuring device according to claim 1, wherein the connecting part comprises an attachment flange to be fastened to the radial outer wall of the turbine engine and to carry the said body through an aerodynamic flow of an aerodynamic duct of the turbine engine.

10. A duct for the aerodynamic flow of a turbine engine, the duct being annular comprising an annular radial outer wall and an annular radial inner wall, the duct being equipped with at least one measuring device according to claim 1, installed radially in the aerodynamic flow, the stud being fitted in between the second end of the body and the radial inner wall, and in contact with the radial inner wall through a flexible connection.

11. The duct according to claim 10, wherein a seal is fitted between the flange of the connecting part and a boss of the radial outer wall.

12. A method for installing a measuring device, according to claim 1, in a duct of the turbine engine, the method comprising:
- mounting the stud on the second end of the body of the measuring device;
- inserting the measuring device together with the stud into the duct of the turbine engine such that the stud comes into contact with the radial inner wall of the duct of the turbine engine;
- providing a predetermined gap (J) in between a boss of a radial outer wall of the duct of the turbine engine and the flange;
- inserting a seal into the predetermined gap (J);
- tightening the flange and the boss using fasteners such that there is a predetermined crushing of the stud on the radial inner wall of the duct of the turbine engine.

13. The method according to claim 12, comprising machining an extra thickness of the stud if the value of the gap measured between the boss and the flange is more than the value of the predetermined gap (J).

\* \* \* \* \*